United States Patent [19]

Chino

[11] 4,063,651
[45] Dec. 20, 1977

[54] ARTICLE CONVEYING APPARATUS
[75] Inventor: Nobuo Chino, Komae, Japan
[73] Assignee: Taisei Kensetsu Kabushiki Kaisha, Tokyo, Japan
[21] Appl. No.: 664,897
[22] Filed: Mar. 8, 1976
[30] Foreign Application Priority Data
June 17, 1975 Japan .............................. 50-81469[U]
[51] Int. Cl.² .............................................. B66C 19/00
[52] U.S. Cl. ................................... 214/1 BB; 134/76; 212/125; 214/1 BC; 214/671
[58] Field of Search ................. 214/1 BC, 658, 1 BH, 214/671, 89, 1 BB; 212/124–127; 134/76–77

[56] References Cited
U.S. PATENT DOCUMENTS

| 2,848,405 | 8/1958 | Lisowski | 134/77 X |
| 3,104,016 | 9/1963 | Harry | 212/125 X |
| 3,834,555 | 9/1974 | Bennington | 214/1 BH |

FOREIGN PATENT DOCUMENTS 36,663 11/1965 Germany ........................ 214/1 BC Primary Examiner—Robert J. Spar
Assistant Examiner—George F. Abraham
Attorney, Agent, or Firm—Wenderoth, Lind & Ponack

[57] ABSTRACT

An improved article conveying apparatus suitable for conveying an article to be processed from an article receiving station to a processing station and for conveying a processed article from the processing station to a product delivery station in a highly efficient manner. This article conveying apparatus has an apparatus main body supported on a track and capable of travelling along said track, an arm supporting frame mounted on the apparatus main body so as to be rotatable about a vertical axis, at least a pair of arms mounted on the frame in a vertically movable manner, and article supporting devices mounted on the respective arms at an equal distance from the vertical axis.

1 Claim, 6 Drawing Figures

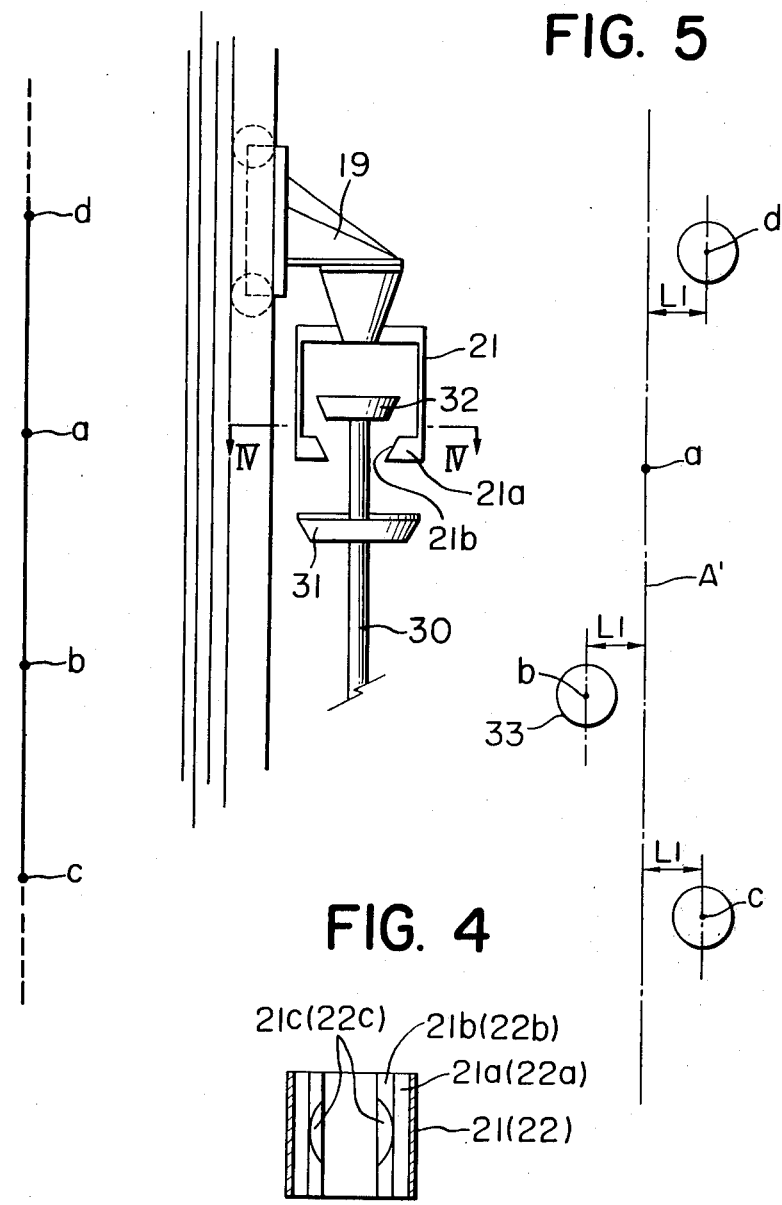

ARTICLE CONVEYING APPARATUS

The present invention relates to improvements in an article conveying apparatus, and more particularly, to an article conveying apparatus suitable for conveying an article to be processed from an article receiving station to a processing station and for conveying a processed article from the processing station to a product delivery station.

Heretofore, the aforementioned type of article conveying apparatuses have been known and commonly used. However, in the conventional apparatus, a main body of the apparatus, which is normally in a rest condition at a standby station, travels along a track in the following manner when processing of an article has been finished at a processing station:

I. It travels from a standby station to a processing station to pick up a processed article,
II. it travels from the processing station to a product delivery station to deliver the processed article to the next succeeding apparatus,
III. it travels from the product delivery station to an article receiving station to pick up a new article to be processed,
IV. it travels from the article receiving station to the processing station to leave the article at the processing station during a predetermined processing period, and
V. it travels back from the processing station to the standby station and rests there.

During the steps (I) to (IV) above, the processing operation at the processing station is necessarily interrupted, and so the operating efficiency of the entire working system including the processing station and the article conveying apparatus is considerably reduced.

Therefore, it is one object of the present invention to provide an improved article conveying apparatus of the above-described type, in which the period of interruption of processing at the processing station is minimized and thereby the overall working efficiency of the system including the processing station and the article conveying apparatus can be enhanced.

According to one feature of the present invention, there is provided an article conveying apparatus comprising an apparatus main body supported on a track and capable of travelling along said track, an arm supporting frame mounted on said apparatus main body so as to be rotatable about a vertical axis, at least a pair of arms mounted on said frame in a vertically movable manner, and article supporting devices mounted on said respective arms at an equal distance from said vertical axis.

Since the article conveying apparatus is constructed as described above, the following loading and unloading operations for a processing device can be carried out. That is, the conveying apparatus main body travels from a standby station to a processing station, where a first article supporting device mounted on a first arm among said arms supports a processed article in the processing device, and then said first arm and said first article supporting device rise to pick up said processed article from said processing device. Subsequently, said frame rotates through a necessary angle, and then a second arm among said arms and a second article supporting device mounted on said second arm descend to position another article supported by said second article supporting device at the position in the processing device where said processed and picked up article was previously located. Then, said conveying apparatus main body travels from said processing station to an article delivery station, where said first arm and said first article supporting device descend to leave said picked up article at said article delivery station. Nextly, said conveying apparatus main body travels from the article delivery station to an article receiving station where said second arm and said second article supporting device rise to pick up an article which has been furnished to said article receiving station. Then, said conveying apparatus main body travels from said article receiving station to said standby station, where it rests in a standby state until the processing in the processing device is finished. When the processing has been finished, the above-described loading and unloading operations for the processing device are repeated.

As described, in the article conveying apparatus according to the present invention, when the conveying apparatus main body travels up to the processing station and stops there, the first article supporting device on the first arm rises while receiving an article placed at the processing station, subsequently the frame rotates through a necessary angle, and then the second arm descends to leave the article on the second article supporting device at the position where said received article was placed, so that if a plating bath, for example, is provided at the processing station, the plating process can be carried out continuously and thereby the rate of operation of the processing device such as a plating bath can be enhanced.

The above described and other features and objects of this invention will become more apparent by reference to the following description taken in conjunction with the accompanying drawings, in which:

FIG. 1 is a diagrammatic view of a conventional article conveying apparatus to be used for explanation of the operation of the apparatus;

FIGS. 2A and 2B together form a front view, when joined at the parting line at the bottom of FIG. 2A, showing one preferred embodiment of the present invention;

FIG. 3 is a front view of an article supporting device in a state just prior to supporting an article;

FIG. 4 is a transverse cross-section of the article supporting device taken along line IV—IV in FIG. 3; and FIG. 5 is a diagrammatic view of the article conveying apparatus according to the present invention to be used for explanation of the operation of the apparatus.

Before giving a detailed description of one preferred embodiment of the present invention, the sequence of operations carried out in a conventional article conveying apparatus as applied to a plating bath, will be described hereunder with reference to FIG. 1.

Referring now to FIG. 1, $a$ designates a standby station, $b$ designates a plating bath station, $c$ designates a product delivery station, and $d$ designates an unfinished article receiving station. The conveying apparatus travels from the standby station $a$ to the plating bath station $b$ in the first step (I) to pick up a plated product from the plating bath; travels from the plating bath station $b$ to the product delivery station $c$ in the second step (II) to leave the plated product at said station $c$; travels from the product delivery station $c$ to the unfinished article receiving station $d$ in the third step (III) to receive an unfinished article, i.e. an unplated article, which has been furnished to said station $d$; travels from the receiving station d to the plating bath station b in the fourth step (IV) to immerse the unplated article in the plating bath; and travels from said station b back to the standby station a in the fifth step (V) and rests there in a standby state until the plating is finished. When the plating has been finished, the aforementioned operations for delivering a plated product and receiving an unplated article are repeated starting from the first step (I) above.

Reviewing the above-described operations from the standpoint of the plating bath, the plating is interrupted during the first to fourth steps (I), (II), (III) and (IV) above. In order to eliminate this idle time of the plating bath, provision should be made such that when the conveying apparatus has travelled from the standby station a to the plating bath station b and has stopped there, a product may be picked up and then an unfinished article can be immersed, and thus the receiving and delivery operations can be conducted continuously so that the plating can be continued in the plating bath even during the period of travelling of the conveying apparatus in the sequence of $b \rightarrow c \rightarrow d \rightarrow a$.

Figures 2, 2A, 2B:
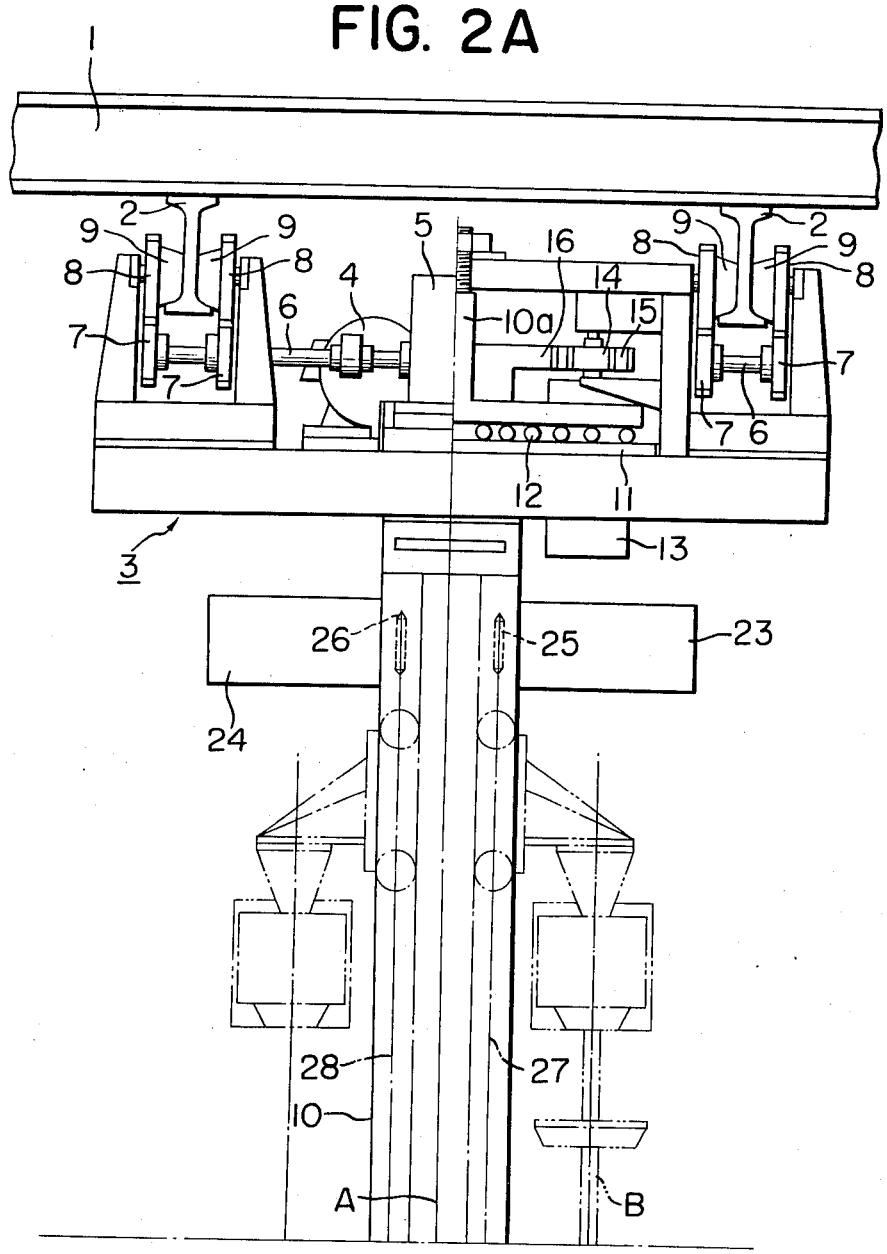
Figure 2B:
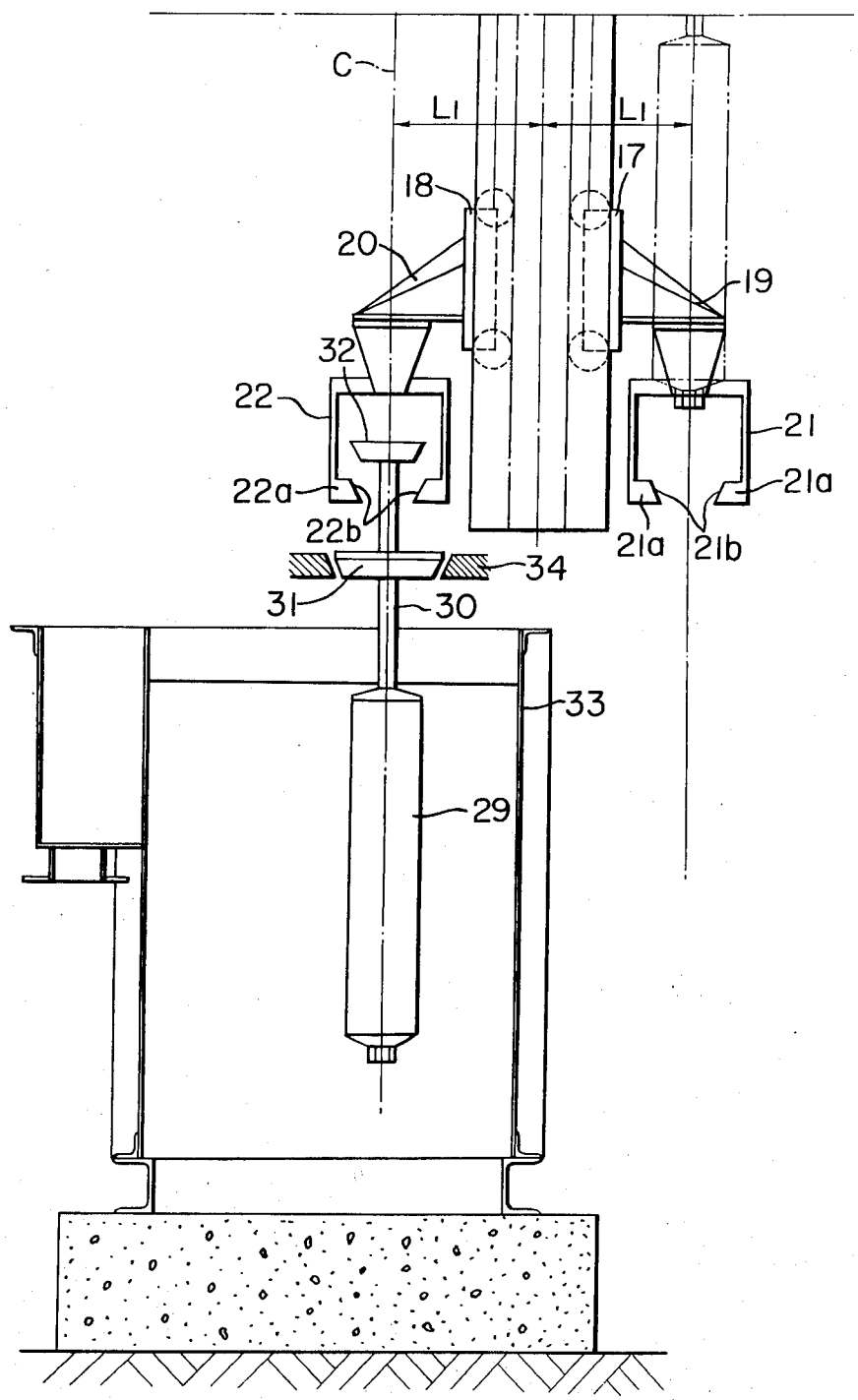

Now the article conveying apparatus according to the present invention will be described in more detail in connection with one preferred embodiment illustrated in FIGS. 2 through 5. Referring now to FIG. 2 which consists of FIGS. 2A and 2B joined together, reference numeral 1 designates a beam, numerals 2 designate travelling rails mounted on said beam 1, numeral 3 designates a conveying apparatus main body, numeral 4 designates a travel driving motor, numeral 5 designates a reduction gear, numeral 6 designates a drive shaft extending from said reduction gear 5, numeral 7 designates a gear fixedly secured to said drive shaft 6, numeral 8 designates another gear meshing with said gear 7, and numeral 9 designates a wheel made of rubber and fixedly secured to said gear 8, so that the conveying apparatus main body 3 can travel along the rails 2 when the wheels 9 are driven by the motor 4 through the reduction gear 5, drive shaft 6, and gears 7 and 8. In addition, reference numeral 10 designates an arm supporting frame, numeral 10a designates a top portion of the frame 10 which extends through the conveying apparatus main body 3 and projects upwardly, numeral 11 designates a slide portion provided on the conveying apparatus main body 3, and numeral 12 designates rollers interposed between said frame top portion 10a and the slide portion 11, which enables the frame 10 to rotate about its vertical center axis A. Further, reference numeral 13 designates a motor for rotating the frame 10, numeral 14 designates a gear mounted on an output shaft of said motor 13, numeral 15 designates another gear meshing with said gear 14, and numeral 16 designates still another gear fixedly secured to said frame top portion 10a and meshed with said gear 15, so that the frame 10 can be rotated by the motor 13 through the gears 14, 15 and 16 and the frame top portion 10a.

Reference numerals 17 and 18 designate trucks mounted on said frame 10 in a vertically movable manner, numeral 19 designates a first arm mounted on said truck 17, numeral 20 designates a second arm mounted on said truck 18, numeral 21 designates an article supporting device having a downwardly opening C-shaped cross-section and mounted on said first arm 19, numeral 22 designates an article supporting device having a downwardly opening C-shaped cross-section and mounted on said second arm 20, numerals 21a and 22a designate projecting edges provided at the bottom of the respective article supporting devices 21 and 22, respectively, numerals 21b and 22b designate tapered surfaces formed on the respective projecting edges 21a and 22a, numerals 21c and 22c as seen in FIG. 4 designate arcuately shaped conical surfaces formed on the respective tapered surfaces 21b and 22b, respectively, numerals 23 and 24 in FIG. 2 designate motors mounted at an upper portion of said frame 10 for vertically moving the trucks 17 and 18, numerals 25 and 26 designate sprockets mounted on output shafts of the respective motors 23 and 24, and numerals 27 and 28 designate chains wound around the respective sprockets 25 and 26 and each having one end connected to the corresponding one said trucks 17 and 18, respectively, and the other end connected to a corresponding weight (not shown), so that when the motor 23 is driven in the positive or negative direction the first article supporting device 21 on the first arm 19 mounted on the truck 17 moves up or down, respectively, and when the motor 24 is driven in the positive or negative direction the second article supporting device 22 on the second arm 20 mounted on the truck 18 moves up and down, respectively.

Reference character B designates a vertical line passing through the center of said first article supporting device 21, character C designates a vertical line passing through the center of said second article supporting device 22, characters $L_1$, $L_1$ designate the distances from the vertical center axis A to the vertical lines B and C, respectively, which are equal to each other. In addition, reference numeral 29 designates an article to be treated, numeral 30 designates a support rod 30 mounted on said article 29 to be treated, numeral 31 designates a first seat plate fixedly secured to said support rod substantially in a concentric manner, numeral 32 designates a second seat plate fixedly secured to the top of said support rod 30, and numeral 33 designates a plating bath.

Referring to FIG. 5, reference character A' designates the locus of travel of said vertical center axis A, that is, the center of the frame 10. In this arrangement, an article receiving station d and a product delivery station c are located on the right side of said travelling locus A', while a processing station consisting of said plating bath 33 is located on the left side of said travelling locus A'.

Now the operation of the article conveying apparatus according to the present invention will be described. It is assumed that at the center position of the article receiving station d are held an article to be plated 29 and an article support rod 30 with the projecting edges 21a and 22a at a height relative to the seat plates 31 and 32 as shown in FIG. 3. On the other hand, it is assumed that in the conveying apparatus main body 3 travelling towards said article receiving station d, the first article supporting device 21 on the first arm 19 mounted on the truck 17 and the second article supporting device 22 on the second arm 20 mounted on the truck 18 are lowered to their lowermost positions as represented by solid lines in FIGS. 2 and 3. Accordingly, when the conveying apparatus main body 3 stops at the article receiving station d, the second seat plate 32 is located at the center of the first article supporting device 21 as shown in FIG. 3. Subsequently, the motor 23 is driven in the positive direction, so that the truck 17, the first arm 19 and the first article supporting device 21 rise to their uppermost position as represented by double-dot chain lines in FIG. 2. Accordingly, the second seat plate 32 is abutted by the arcuately shaped conical surfaces 21c of the first article supporting device 21, and the article to be treated 29 is raised up to the position represented by the double-dot chain lines in FIG. 2. At this moment, the truck 18, the second arm 20 and the second article supporting device 22 are still held at the lowermost position. After the article to be treated 29 has been suspended as described above, the conveying apparatus main body 3 travels to the standby station a and rests there in a standby state until plating of the preceding article is finished. When the plating has been finished in the plating bath 33, the conveying apparatus main body 3 travels to the processing station b consisting of the plating bath 33 and stops there. In said plating bath 33 is a product or a worked article 29, and so, when the conveying apparatus main body 3 has stopped as described above, the second seat plate 32 mounted on said product 29 is located at the center of the second article supporting device 22 as seen in FIG. 2 (more particularly, in FIG. 2B). Subsequently, the motor 24 is driven in the positive direction, so that the truck 18, the second arm 20 and the second article supporting device 22 rise to their uppermost position. Accordingly, said product 29 is picked up from the plating bath 33 and is suspended. Then the motor 13 is driven to rotate the frame 10 180°. Accordingly, the plated product 29 is displaced to the position of the vertical line B in FIG. 2, while the article to be treated 29 which has been conveyed from the article receiving station d is displaced to the position of the vertical line C in FIG. 2. Nextly, the motor 23 is driven in the negative direction, so that the truck 17, the first arm 19 and the first article supporting device 21 are lowered to their lowermost position. Consequently, the first seat plate 1 mounted on the article supporting rod 30 rides on an electrode 34 having a conical receiving surface in the plating bath 33, while the second seat plate 32 is located at the center of the first article supporting device 21. Subsequently, the conveying apparatus main body 3 travels to the product delivery station c, where the motor 24 is driven in the negative direction, so that the truck 18, the second arm 20 and the second article supporting device 22 are lowered to their lowermost position, where the first seat plate 31 rides on a product support plate (not shown) provided at said product delivery station c and having a similar configuration as the electrode 34, while the second seat plate 32 is located at the center of the second article supporting device 22, and in this way the plated product 29 is left at the article delivery station c. Then, the conveying apparatus main body 3 travels back to the article receiving station d and repeats the same cyclic operations for loading and unloading articles to and from the plating bath 30 as described above.

Since many changes could be made in the above construction and many apparently widely different embodiments of this invention could be made without departing the scope thereof, it is intended that all matter contained in the above description or shown in the accompanying drawings shall be interpreted as illustrative and not in a limiting sense.

What is claimed is:

1. An automatic processing apparatus comprising: a track extending from an unprocessed article receiving position past a processing means to a processed article delivery position; a carrier device supported on said track for freely travelling on said track and having a body, an arm supporting frame freely rotatably mounted on said body for rotation around a vertical axis, a pair of arms fixed to said arm supporting frame and protruding radially in opposite directions from said arm supporting frame, and a pair of supports, one fixed to each arm, each of said supports being C-shaped and having two spaced opposed portions on the lower side thereof defining an opening therebetween, said opposed portions each having on the end thereof facing said opening a surface having an upwardly diverging frusto-conical shape with the two surfaces lying on a common cone the vertical axis of which coincides with the center of said support, said supports being fixed to said arms with the relative positions of said centers on the circumference of a horizontal circle around said vertical axis of said arm supporting frame, the locus of the center of one of said supports on one side of the locus of said vertical axis of said carrier device during the travel of said carrier device along said track being a carrier line between the unprocessed article receiving position and said processed article delivery position, and locus of the center of said support on the other side of the locus of said vertical axis of said carrier device during travel of said carrier device being a processing line which extends through the processing means; a supporting element at each of said unprocessed article receiving position, said processed article delivery position and said processing means and having two spaced opposed portions defining an opening therebetween, said opposed portions each having on the end thereof facing said opening a surface having an upwardly diverging frusto-conical shape with the two surfaces lying on a common cone the vertical axis of which lies on the locus through the respective positions and processing means; and a carrier jig provided for each article to be processed and having a supporting means constituted by a supporting rod having a size for freely passing through said openings in said supports and said supporting elements, a first engaging plate on said rod having an upwardly diverging frusto-conical peripheral surface complementary in shape to the opposed end surfaces of the portions on the supports and firmly engagable with said opposed portions of said supports, and a second engaging plate on said rod below said first engaging plate and having an upwardly diverging frusto-conical peripheral surface complementary in shape to the opposed end surfaces of the portions on the supporting elements and firmly engagable with said opposed portions of said supporting elements, whereby when the processing of an article to be processed by said processing means ends, the carrier device is caused to travel along said track to said unprocessed article receiving position to pick up an unprocessed article fitted with a carrier jig by engaging the support moving along the carrier line with the first engaging plate on the jig, and then said carrier device is caused to travel along said track to the position of said processing means and the support moving along the processing line is caused to engage the first engaging plate on the jig on the processed article in said processing means, said arms are raised and said arm supporting frame is turned 180° to transfer the unprocessed article to the processing line and the processed article to the carrier line, the support carrying the unprocessed article is lowered to engage the second engaging plate on the jig on the unprocessed article with the supporting element at the processing means to permit processing of the unprocessed article, and then the carrier device is caused to travel along said track to carry the processed article to the processed article delivery position along the carrier line.

* * * * *